US004001584B2

United States Statutory Invention Registration [19]

[11] Reg. Number: H1584

Moore et al.

[45] Published: Aug. 6, 1996

[54] MINE TAILINGS REPLACEMENT

[75] Inventors: Terry J. Moore; Winton G. Aubert, both of Plano, Tex.

[73] Assignee: Atlantic Richfield Company, Los Angeles, Calif.

[21] Appl. No.: 518,072

[22] Filed: Aug. 22, 1995

[51] Int. Cl.[6] ..... B09B 1/00

[52] U.S. Cl. ..... 588/250

*Primary Examiner*—Stephen C. Bentley
*Attorney, Agent, or Firm*—Michael E. Martin

[57] ABSTRACT

Mine tailings and similar materials are disposed of by replacing the tailings in underground mineworks including the shafts, adits and drifts by forming a slurry of tailings using dredging or similar mixing processes and pumping the slurry to the mineworks. Cementitious materials may be added to selected quantities of the tailings slurries to form cement plugs for placement at selected intervals in the mineworks to minimize connectivity of the mineworks shafting, adits and drifts. The mineworks may be dewatered to provide a source of water for the slurrification process and the water may be reused after separation from the slurry. The disposal process provides a convenient way of replacing mine tailings in a repository of similar mineralogy and at least partially eradicates abandoned mineworks, including shafting, adits and drifts, which otherwise might require continual monitoring and dewatering.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MINE TAILINGS REPLACEMENT

BACKGROUND OF THE INVENTION

1. Field of the Invention

The present invention pertains to a method and system for replacing mine tailings and similar materials in abandoned mineworks.

2. Background

Certain particulate materials such as mine tailings and other earth materials which have been processed and disposed of may present certain environmental hazards if left to reside on the earth's surface in so-called tailings piles, ponds and other repositories which are exposed to wind and rain. In certain areas mine tailings and the residue of related earth material processing operations may also be found disposed alongside rivers or similar bodies of water or in conventional disposal pits or ponds.

Moving these materials may involve costly dewatering, excavating, drying and storage operations, including material conversion techniques which are or can be in themselves environmentally injurious. On the other hand mine tailings and the residue of other processing operations on earth materials and minerals produce particulate material which is suited to implementation of techniques that utilize mechanical or hydraulic disaggregation, suspension and pumping. For example, mine tailings disposed in piles, pits or ponds may be well suited to dredging operations, slurrification, pumping and transport by pipeline. Excavation of these materials using conventional dredging and pumping techniques can be carried out without contaminating groundwater in adjacent areas. Moreover, certain mine tailings and the residue of ore body processing operations may, when mixed with a cementitious material, form a suitable hardable composition which may, at least, be used as a filler or plugging material and may have certain structural applications. Moreover, hardened cementitious mixtures or grouts may be capable of neutralizing residual acidic components in the tailings and provide physical stability of these materials.

A related problem in dealing with abandoned mine sites pertains to handling groundwaters which accumulate in and leak through mine shafts, drifts and adits. Such sites may also cause contamination of surrounding groundwaters in many instances. However, dewatering underground mine sites can cause problems in regard to treatment and disposal of the removed water, and oxidation of in situ minerals and metals which become exposed to atmospheric air after the dewatering process. Accordingly, abandoned mine workings themselves can comprise environmental hazards and hazards to the personal safety of individuals present in the vicinity of the mineworks.

The problems associated with removing mine tailings and similar materials from stream beds, pits, ponds or tailings piles and the problems associated with reducing the risks to personal safety and the environment from abandoned mine workings have heretofore remained largely unsolved. However, in accordance with the present invention these problems can be substantially overcome.

SUMMARY OF THE INVENTION

The present invention provides a unique method for disposing of mine tailings and similar particulate earth materials by creating a transportable slurry of such tailings and related materials and replacing these materials in abandoned mineworks including mine shafts, drifts and adits.

In accordance with one important aspect of the invention particulate mine tailings or mine process wastes and similar materials disposed in tailings ponds, pits or piles or disposed along stream beds, are excavated using conventional hydraulic dredging techniques and transported to nearby mineworks for replacement in the mineworks as a disposal repository.

In accordance with another important aspect of the present invention, mine tailings are replaced in the earth in the same location whence they came by forming a slurry of tailings particulates and water, pumping the slurry into abandoned mineworks having substantially the same mineralogy as the particulates, including mine shafting, drifts and adits, to minimize the environmental risks associated with exposure of these materials. Moreover, the hazards associated with abandoned mineworks are also reduced through at least partial filling of the mineworks with the replaced tailings.

In accordance with yet another aspect of the invention, the hazards associated with abandoned mineworks are at least partially reduced by filling the mineworks with a particulate material which may be at least partially solidified by mixing the particulate material with a cementitious composition and transporting the mixture as a cement slurry to the mineworks to provide solidified plugs of material which at least may be adapted to plug or close off certain portions of the mineworks. The present invention further contemplates a technique of replacing mine tailings in abandoned mineworks through strategic placement of certain quantities of a slurry of tailings and water together with a cementitious material to form solid coherent plugs in the mineworks which will confine the tailings slurries.

The present invention still further contemplates a method of slurrification and transport of mine tailings and similar materials by utilizing a source of water from abandoned mineworks wherein the mineworks are simultaneously dewatered and the water is used to form a transportable slurry of tailings material which is then injected into the dewatered mine. Excess water may be reused to form additional slurry or, eventually, treated for surface or deep well disposal.

The treatment of mine tailings and similar materials in accordance with the invention provides several advantages. The tailings are replaced in workings from which they were initially removed and have similar mineralogy to the host rock, except that a substantial portion of sulfides and metals normally have been removed as a result of the original mining process. The tailings preparation and transport process may be carried out using essentially conventional excavation, pumping and transport equipment used in conventional hydraulic dredging operations, for example. The method of excavation and transport using dredging and pumping decreases or substantially eliminates the generation of airborne dust from the excavation site. Careful observation of the local water table and use of water collected from nearby abandoned mineworks minimizes the contamination of groundwater in adjacent areas. Transportation costs are minimal as a result of the use of dredging, mixing, slurrying and pumping operations.

Moreover, forming a grout or hardenable cementitious composition using the above mentioned tailings and similar materials provides a more permanent disposal technique and fine particles of tailings are substantially reduced or eliminated. Through careful placement of plugs of cement or grout, using the mine tailings material, in abandoned mineworks and the like, the entire tailings mass removed from a particular excavation site would not have to be stabilized by a cement material. Grouting portions of underground mineworks can decrease the pumping required for mine dewatering processes. Grouting the mineworks with a tailings based grout mixture or replacing loose tailings materials in the mineworks can also reduce the rate of water migration through the mineworks and reduces oxygen exposure to the minerals in the abandoned mineworks.

Those skilled in the art will recognize the above mentioned features and advantages of the invention together with other superior aspects thereof upon reading the detailed description which follows in conjunction with the drawing.

DESCRIPTION OF PREFERRED EMBODIMENTS

Figure 1:
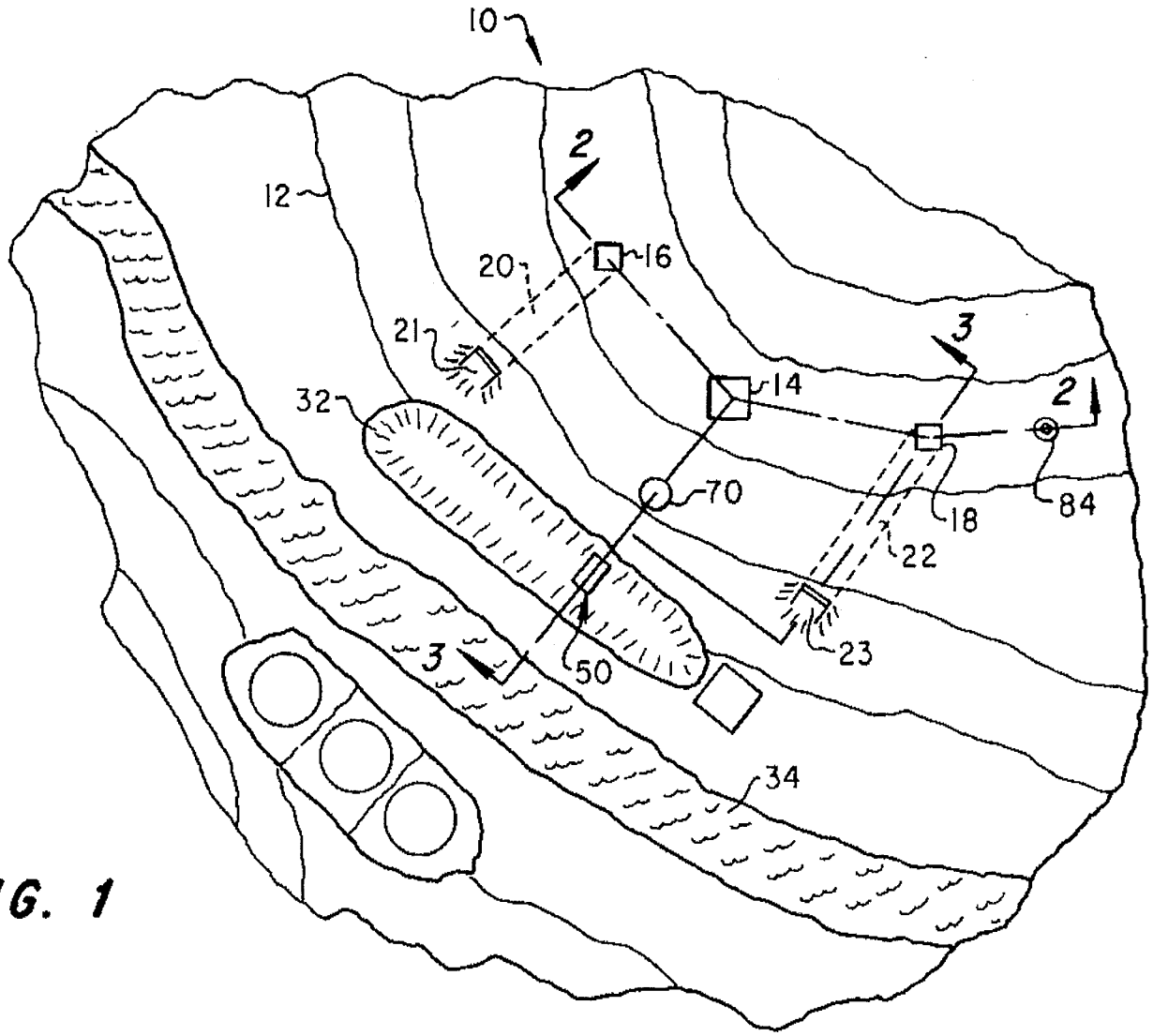
FIG. 1 is a plan view, in somewhat schematic form, showing a typical underground mine site with a tailings disposal pond and nearby stream bed which are being treated by the method of the present invention.

In the description which follows like elements are marked through the specification and drawing with the same reference numerals, respectively. The drawing figures are not necessarily to scale in the interest of clarity and conciseness.

Figure 2:
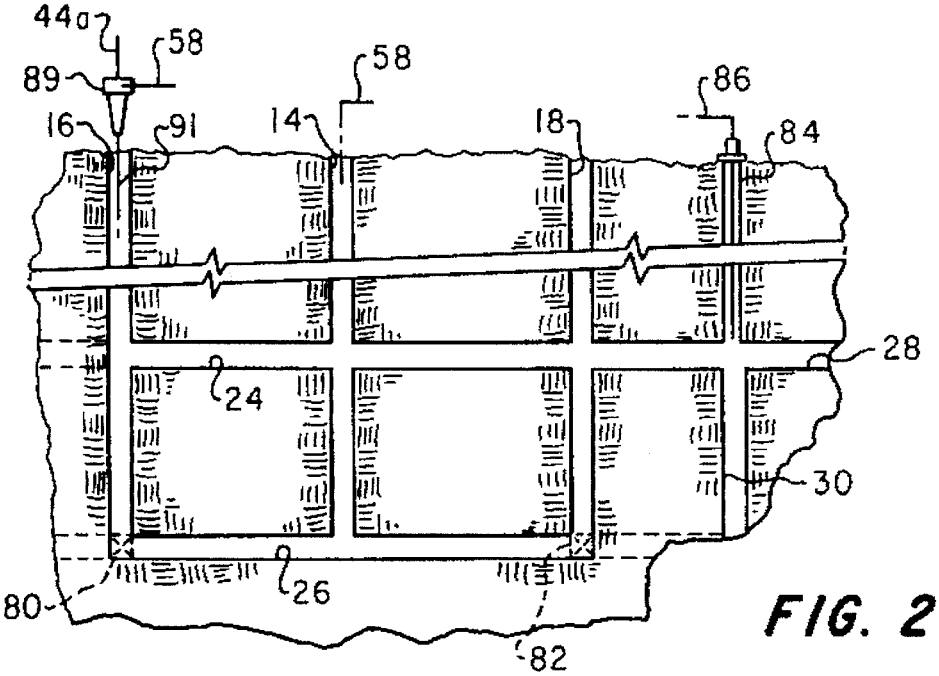
FIG. 2 is a section view of the mineworks shown in FIG. 1, in somewhat schematic form, and taken generally from the line 2—2 of FIG. 1.
Figure 3:
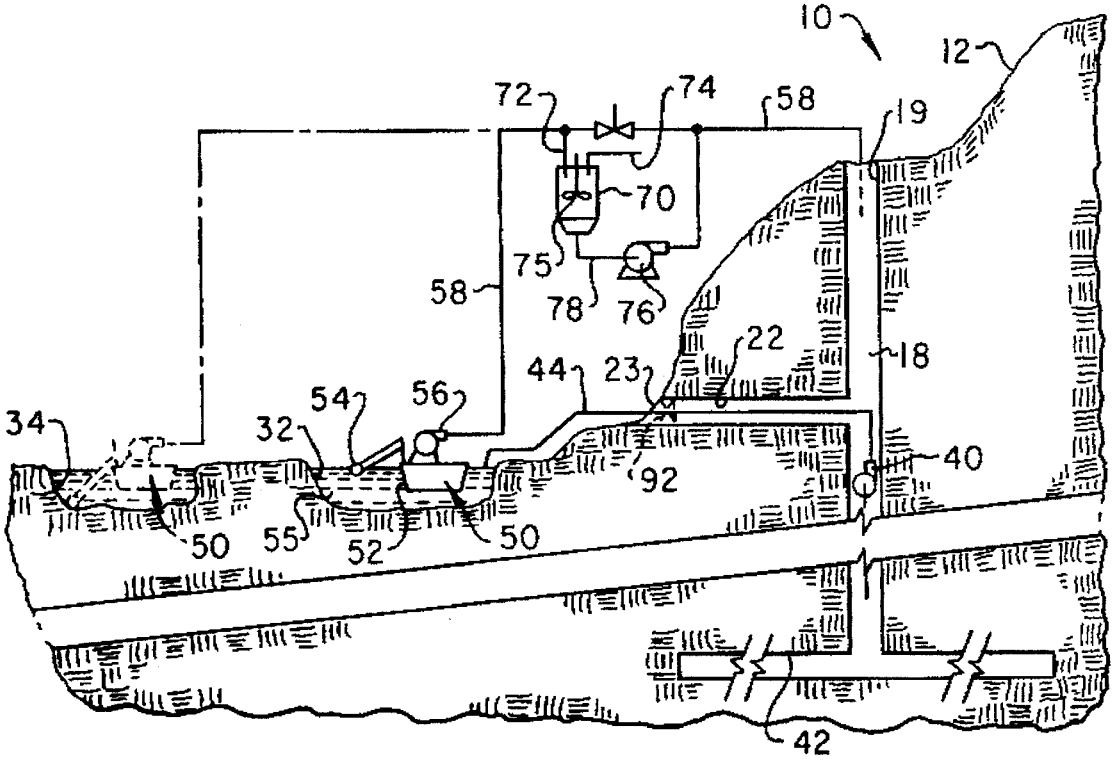
FIG. 3 is a schematic view taken generally along the line 3—3 of FIG. 1 showing the system used in practicing the method of the present invention.

Referring to the drawing figures, there is illustrated in somewhat schematic form, and by way of example, a typical underground mineworks, generally designated by the numeral 10, which has been at least partially worked out or abandoned, for example. The mineworks 10 is disposed under the side of a hill 12 in which a main, generally vertical mine shaft 14 has been extended together with adjacent secondary shafts 16 and 18, for example. At least two adits 20 and 22, see FIG. 3 also, extend from the shafts 16 and 18, respectively, and open out of the side of the hill 12 at respective openings 21 and 23. As shown in FIG. 2, one or more generally horizontal drifts 24 and 26 interconnect the shafts 14, 16 and 18. A drift extension 28 extends from the shaft 18 and may include a secondary shaft 30 extending generally vertically therefrom. As shown in FIGS. 1 and 3, the mine site 10 is also provided with a mine tailings disposal area, generally designated by the numeral 32, which may comprise a pit or a pond wherein initial processing of material originally excavated from the mine resulted in the generation of tailings which were deposited in the pit or pond 32. The tailings repository may also comprise a pile extending above grade elevation. At least some of the tailings deposited outside of the mineworks 10 may have become deposited in the stream bed of a river or the like, generally designated by the numeral 34, through erosion from wind and runoff from rain or snow or as a result of processing operations. In any event, the pond or pit 32 and the stream bed 34 may include significant quantities of tailings materials in the form of relatively fine particulate solids having mineralogy similar to that defining the mineworks characterized by the shafts 14, 16 and 18, the adits 20 and 22 and the drifts 24, 26 and 28, for example. As shown in FIG. 3 the tailings pit 32 may be disposed at a lower elevation than the adits 20 and 22, including the opening 23 from the adit 22, as shown.

One or more of the mine shafts 14, 16 and 18 may require periodic or even continuous dewatering to prevent migration of water through the mine and contamination of groundwater supplies. FIG. 3 shows a motor driven pump 40 disposed in the mine shaft 18 and operable to discharge water from the shaft, as well as a drift 42 connected thereto, to the exterior of the mine by way of a discharge conduit 44.

The invention contemplates replacing mine tailings disposed in the pit 32 and/or in or adjacent to the stream bed 34 by employing a hydraulic dredge, indicated schematically in FIG. 3 and generally designated by the numeral 50. The dredge 50 may be of a conventional type having a support vessel 52, a movable cutter head and suction pipe assembly 54 and a pump 56 connected thereto in a known manner. Conventional dipper and elevator type excavating dredges may also be used. The dredge 50 is adapted for excavating tailings disposed in the pit 32 and which are mixed with water 5 disposed in the pit from one of several sources including the mine dewatering operation carried out by the pump 40 and the conduit 44. The excavation of mine tailings from the pit or pond 32 is carried out by a slurrification and/or dredging operation whereby a slurry .of solids particulates of mine tailings and water is discharged from the pump 56 and is conducted by way of a conduit 58 either directly to the entrance 19 of the mine shaft 18, FIG. 3, or by way of a processing system to be described hereinbelow. The preparation of a slurry of mine tailings and water may not require dredging per se. Tailings or similar earth materials in relatively fine particulate form may be otherwise suitably mixed with water and pumped to the mineworks 10 in a manner somewhat similar to a dredging operation but not strictly considered a dredging operation.

Alternatively, as shown in FIG. 3, the dredge 50 may be disposed in the adjacent river for excavating solids contaminants from the stream bed 34, including the aforementioned mine tailings. The water source for slurrification of the tailings or similar materials may, of course, be the river itself. However, by using water from the mineworks 10, as described above, to carry out the dredging and slurrification operation, a source of water for dredging is provided and the mine is simultaneously dewatered to provide a space for the mine tailings to be permanently stored. As the tailings are replaced in the mine the solids suspended in the slurry may settle out leaving additional water for continuous reuse in the dredging, slurrification and transport operation. The illustration of the drawings is merely exemplary in this respect and those skilled in the art will appreciate that, depending on the construction of the mineworks, replacement of the. tailings slurry in the shafting or drifts may displace water therein which can be collected and pumped to the pit or pond 32, as desired.

Referring further to FIG. 3, it may be desirable to mix the slurry discharged from the pump 56 with additional solids particulates or with a cementitious material to form a hardenable composition which may be pumped into the mineworks 10 at certain specific locations and allowed to solidify to block certain passages in the mineworks. In this way, the slurried tailings may be contained or totally encapsulated. Moreover, mixing the tailings with conventional cement materials may provide chemical changes such as reducing the acidity of the tailings. Accordingly, a suitable mixing tank 70 is shown schematically in FIG. 3 having a branch inlet conduit 72 leading from the conduit 58, a second inlet conduit 74 for discharging selected materials into the tank and a mixing apparatus 75 interposed therein for performing certain mixing operations. A pump 76 is also provided in a communication with an outlet conduit 78 from the mixing tank 70. The pump 76 is suitably connected to the conduit 58 for discharging a slurry of cementitious material and mine tailings or similar materials for disposal in the mineworks 10. Suitable control valving, not shown in detail in FIG. 3, may be associated with the conduits 58, 72, 74 and 78 for controlling flow to and from the tank 70. A system similar to that disclosed in U.S. Pat. No. 5,109,933 issued May 5, 1992 to James E. Jackson and assigned to the assignee of the present invention may also be utilized in preparing a slurry for placement in the mineworks 10.

Accordingly, a slurry of mine tailings or similar materials may be prepared utilizing a dredging operation comprising a conventional dredge, such as the dredge 50, or by preparing the tailings slurry in a system similar to that described above, or in the above mentioned patent, and pumped into the mineworks 10. In order to appropriately fill the mineworks 10, it may be necessary to plug certain intervals in the mineworks with a plug of hardenable cementitious material, including mine tailings, by mixing the tailings with an appropriate quantity of water and a cement such as Portland cement, slag cement, calcium hydroxide, pozzolanic materials or the mine tailings themselves may comprise a material suitable for forming a hardenable mass after proper hydration.

Referring to FIG. 2, for example, a cement/tailings plug 80 may be formed at the intersection of the shaft 16 with the drift 26 to enable at least partial filling of the shaft 16 with a tailings slurry or dewatered tailings material until reaching the level of the drift 24. In addition, a similar plug 82 may be formed at the intersection of the shaft 18 with the drift 26 whereupon the remainder of the drift 26 and the shaft 14 up to the level of drift 24 may also be filled with dewatered tailings or a tailings slurry. Still further, the entire mineworks below the drift 24 may be filled with a tailings slurry or a hardenable tailings/cement slurry composition. Various combinations of plugging the intervals of the mineworks 10 may be carried out to properly fill and contain the tailings material in the various shafts and drifts.

Alternatively, if a shaft, drift or adit cannot be adequately filled by pumping the slurry into one or more of the shafts, one or more wells, such as a well 84, may be drilled into the earth to intercept a drift 28 or a shaft extension 30 and the well then connected to the slurry discharge conduit 58 by way of a wellhead injection conduit 86. The well 84 may be a simple open hole structure without casing or injection conduit structures or a wellhead, depending on the terrain through which the well is drilled.

The tailings slurry may also be dewatered at or near the point of deposit into the mineworks 10 using suitable separation equipment such as a hydrocyclone type separator 89, FIG. 2, situated for discharging dewatered tailings into shaft 16 by way of a conduit 91. The water separated at the separator 89 may be returned to the pond 32 via a conduit 44*a*.

As shown in FIG. 3, the entrance 23 to the adit 22 may be suitably plugged with a tailings/cement plug 92 prior to filling the shaft 18 so that the adit 22 and shaft 18 may contain replaced mine tailings. The pump 40 and the conduit 44, would be removed prior to filling the remainder of the shaft 18 and the adit 22.

Although forming a cementitious slurry which would harden into a solid mass may not be necessary for every bit of the tailings slurry pumped into the mineworks 10, cement could be added periodically to the tailings slurry as it is pumped into the mineworks to form plugs within the selected shafting, adits or drifts that would physically stabilize and prevent movement of the tailings slurry. Once the tailings slurry has been injected, dewatering from points below the slurry location, in the vicinity of placement, can prevent excess accumulation of waters which could eventually effect groundwater quality or eventually require pumping from the mineworks. This early removed water could, of course, be returned to the excavation site, such as the pond 32, for use in excavating additional tailings material.

By dredging tailings and similar materials from pits, ponds and other repositories in the vicinity of mineworks, such as the mineworks 10, the resulting slurry may be effectively transported over the relatively short distances required by pumps and pipelines. The slurries are typically dewatered once in place in the mineworks by settling, or mechanical separation may take place at discharge into the mineworks with return of the water to the slurrification process. Stabilizing the tailings, once deposited in the mineworks or similar repositories, may be carried out by adding the aforementioned cement materials to form a solid mass usable as plugs at strategic locations in the mineworks or throughout. The cement materials have the added advantage of neutralizing residual acidic components in the tailings. Differences in density between the cementitious slurry and groundwater in the mineworks also facilitates placement of the slurry into underground works. Gravity flow may be utilized in most cases once the slurry has been conveyed by pipeline to the mine inlets such as the inlets to the shafts 14, 16 and 18 or to the injection well 84. The ultimate disposition of the mine tailings is advantageous in that, particularly, if the tailings are formed as a grout or cement composition, a permanent location is assured. Moreover, replacing the tailings into a host rock with almost identical mineralogical composition provides certain advantages. Still further, filling abandoned mineworks with the tailings reduces the exposure of the mineworks to oxidation.

Placing cement plugs at intersections of the mine shafting and drifts reduces the connectivity of these structures and the disadvantageous of leaving such connectivity in place. Still further, by filling the mineworks with the tailings slurry, either loose or in solidified form, the mine shafts and adit entrances may be secured and unwanted access restricted or prevented.

Those skilled in the art will recognize that various substitutions and modifications may be made to the invention described above without departing from the scope and spirit of the appended claims.

What is claimed is:

1. A method for disposing of mine tailings and similar materials comprising the steps of:

forming a slurry of said mine tailings;

transporting said slurry to an underground mineworks; and depositing said slurry in said mineworks.

2. The method set forth in claim 1 including the step of:

pumping water from said mineworks and adding said pumped water to said mine tailings to form said slurry.

3. The method set forth in claim 1 wherein:

the step of forming said slurry comprises dredging said mine tailings from a tailings disposal site.

4. The method set forth in claim 3 including the step of:

pumping water from said mineworks to said disposal site and forming said slurry from said tailings at said disposal site and said pumped water.

5. The method set forth in claim 1 including the step of:

adding a cementitious material to said slurry to form a hardenable mass for disposition in said mineworks at a predetermined place therein.

6. The method set forth in claim 1 including the step of:

forming said slurry by mixing said mine tailings with a quantity of water in a mixing tank and pumping said slurry from said mixing tank to said mineworks for disposal therein.

7. The method set forth in claim 1 including the step of;

separating water from said slurry of tailings and water prior to depositing said tailings in said mineworks.

8. The method set forth in claim 7 including the step of:

conducting said water separated from said slurry to a location for forming an additional slurry of said tailings and said separated water.

9. The method set forth in claim 1 wherein:

the step of depositing said slurry in said mineworks comprises conducting said slurry through an injection well drilled into a part of said mineworks.

* * * * *